April 12, 1960     I. E. KASS ET AL     2,932,473
COMBINED HINGE, STRUCTURAL MEMBER AND ACTUATOR
FOR AIRCRAFT CONTROL SURFACES
Filed March 26, 1957     3 Sheets-Sheet 1
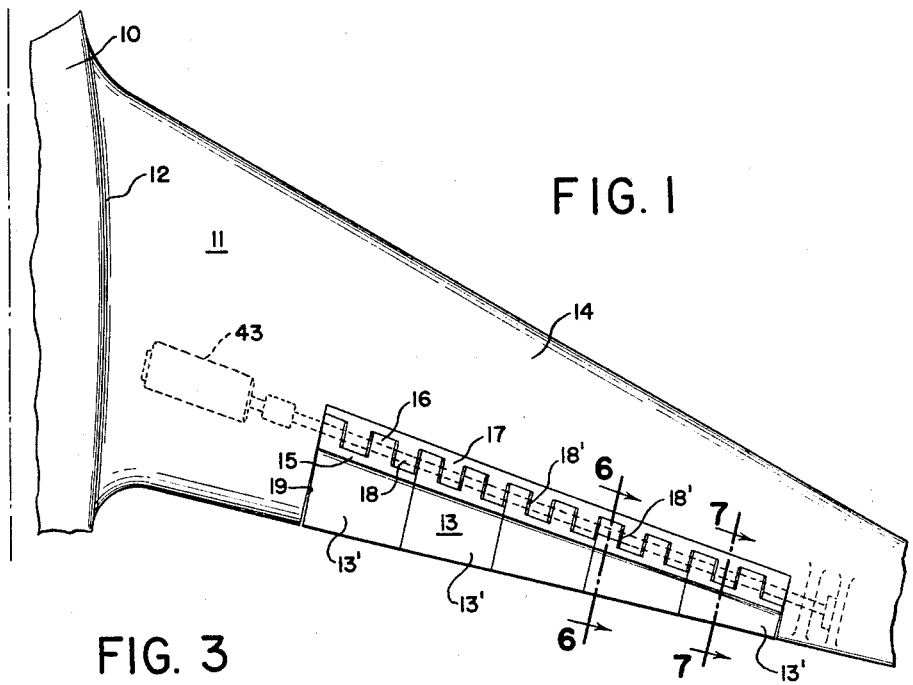
FIG. 1
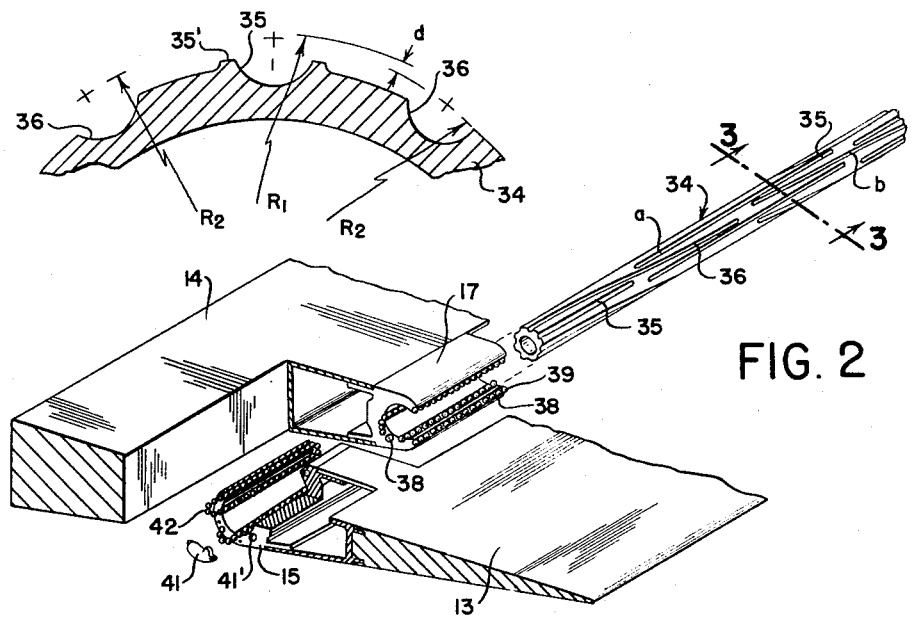
FIG. 3
FIG. 2
INVENTORS
IRVIN E. KASS
GUSTAVE A. ROUVELLAT
BY
ATTORNEY April 12, 1960     I. E. KASS ET AL     2,932,473
COMBINED HINGE, STRUCTURAL MEMBER AND ACTUATOR
FOR AIRCRAFT CONTROL SURFACES
Filed March 26, 1957     3 Sheets-Sheet 2
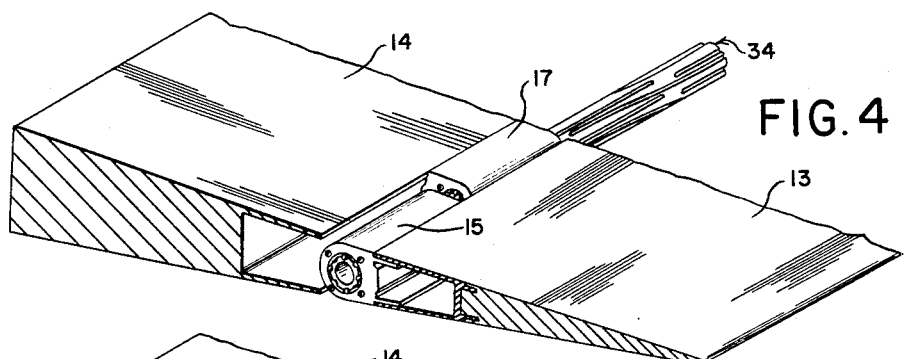
FIG. 4
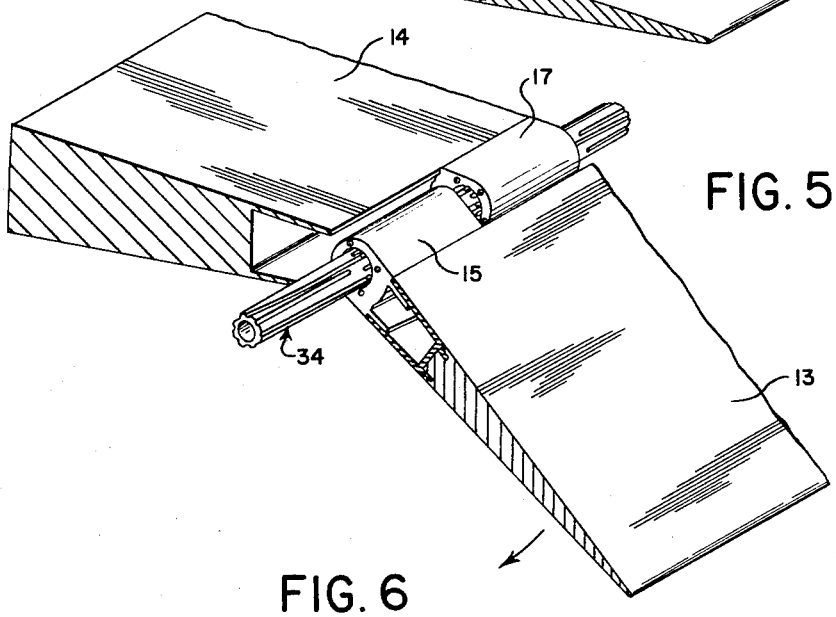
FIG. 5
FIG. 6
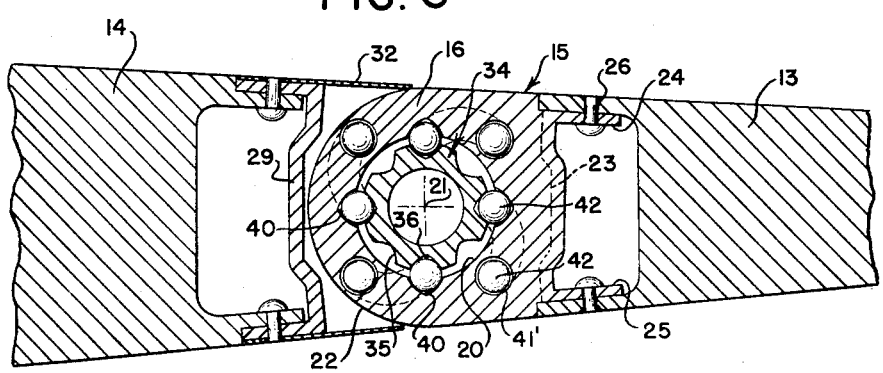
INVENTORS
IRVIN E. KASS
GUSTAVE A. ROUVELLAT
BY
*Julian C. Renfro*
ATTORNEY April 12, 1960 I. E. KASS ET AL 2,932,473
COMBINED HINGE, STRUCTURAL MEMBER AND ACTUATOR
FOR AIRCRAFT CONTROL SURFACES
Filed March 26, 1957 3 Sheets-Sheet 3

INVENTORS
IRVIN E. KASS
GUSTAVE A. ROUVELLAT
BY
*Julian C. Renfro*
ATTORNEY

United States Patent Office 2,932,473
Patented Apr. 12, 1960

2,932,473

COMBINED HINGE, STRUCTURAL MEMBER AND ACTUATOR FOR AIRCRAFT CONTROL SURFACES

Irvin E. Kass, Towson, and Gustave A. Rouvellat, Baynesville, Md., assignors to The Martin Company, a corporation of Maryland Application March 26, 1957, Serial No. 648,584

7 Claims. (Cl. 244—90)

The present invention relates to the construction and actuation of aircraft control surfaces, and more particularly to a combined hinge, structural member and actuator for the wing flaps, ailerons, and other flight controlling elements of high-speed aircraft having thin control surfaces.

In high-speed aircraft, the various control surfaces, such as the wings and stabilizers, are relatively thin, to facilitate the high-speed movement of air over the surfaces, and are designed to be as free as possible from projections presenting drag surfaces. Accordingly, it is desirable to utilize means contained wholly within the cross-sectional outlines of the control surfaces for actuating flight controlling elements such as wing flaps, ailerons and the like. In this respect, it has been proposed heretofore to utilize an axially movable, splined control member serving in a combined capacity as hinge pivot and actuator means for a flight controlling element. The arrangement is such that when the control member is displaced axially the flight controlling element is pivoted with respect to the main control surface, about the axis of the control member.

Arrangements of the type above described have not proven to be entirely satisfactory, however, particularly in respect of the mounting and control of wing flaps and ailerons. As a general rule, the wings of an aircraft are cantilever mounted, being secured only at their root ends to the aircraft fuselage, and during flight the outer portions of the wings may deflect to a considerable extent. In such cases, an elongated control member disposed spanwise of the wing tends to bind, when the wing deflects, and requires heavier actuating means to assure proper operation.

One of the important features of the invention resides in the provision of an improved thin-surface control assembly for a high-speed aircraft, which assembly incorporates a combined hinge and actuator rod for a hinged flight controlling element in a manner such that binding of the control rod is avoided during transverse deflections of the various control surfaces. More specifically, the invention provides an improved thin-surface control assembly in which an elongated control rod hingedly connects a movable flight controlling element to a main control surface body over a substantial distance spanwise of the body, and in which the main control surface body, flight controlling element and control rod are operatively connected by anti-friction actuator means of the recirculating ball type, providing for anti-frictional movement of the control rod at all times. Advantageously, the recirculating ball actuator means are so arranged that the control rod, although serving as a hinge, is supported in spaced relation to hinge arms of the control surface body and flight controlling element. The arrangement is such that the control rod at all times operates in the absence of sliding friction, even through the control surface assembly may be deflected spanwise to a substantial extent.

Another important feature of the invention resides in the provision of an improved thin-surface control assembly for high-speed aircraft in which a hinge and control rod assembly for a flight controlling element is incorporated in an additional capacity as a structural element, imparting additional spanwise stiffness to the thin-surface structure.

In accordance with the present invention, an improved hinge structure is provided for supporting a movable flight controlling element, wherein the hinge structure comprises a relatively large number of interfitting hinge arms, resembling an oversize piano hinge. Alternate ones of the hinge arms are mounted on the main control surface body and include means coacting with an axially movable control rod in a manner such that torsional forces in the rod are reacted in the main control surface body at closely spaced intervals spanwise of the body. The improved structure is advantageous in that build-up of angular deflection in the flight controlling element is avoided. Accordingly, the flight controlling element need not be designed to have substantial strength to resist torsional deflection, and a considerable saving in weight is realized in the overall structure.

In respect of the thin-surface control assemblies, the improved hinge assembly, as above described, is particularly advantageous in that continuous support is thereby provided for the flight controlling element, and this aids materially in the prevention of flutter in the control element. Flutter prevention is also improved by the structural design of the flight controlling element to withstand chordwise loads only, substantially neglecting provisions for torsional stiffness, as set forth in the preceding paragraph. In this latter respect, the new structure permits of a flight controlling element of reduced mass, with its center of gravity located substantially closer to the pivot axis than in flight controlling elements of conventional design.

Another important aspect of the improved hinge design, having particularly advantageous utility in connection with thin-surface control assemblies, is that the flight controlling element may be formed in a plurality of separate sections of short spanwise dimensions. Each section is separately hinged, but all sections are operated in unison by a single control rod. The improved structure permits the flight controlling element to be operated at a time when the main control surface body is deflected to a substantial degree, without splitting or buckling the outer edges of the element.

As a general rule, the new control assembly may be incorporated in the wing structure of high-speed aircraft. However, the assembly may be incorporated in other control surfaces where desirable or expedient.

For a better understanding of the invention, reference should be made to the following detailed description and accompanying drawings, in which:

Fig. 1 is a fragmentary top plan view of an aircraft wing structure incorporating the improved features of the invention;

Fig. 2 is a fragmentary exploded perspective view, with parts broken away, illustrating details of construction of the wing structure of Fig. 1;

Fig. 3 is an enlarged fragmentary cross-sectional view taken on line 3—3 of Fig. 2;

Figs. 4 and 5 are fragmentary perspective views of the wing structure of Fig. 1, illustrating the operation of a flight controlling element thereof;

Figure 7:
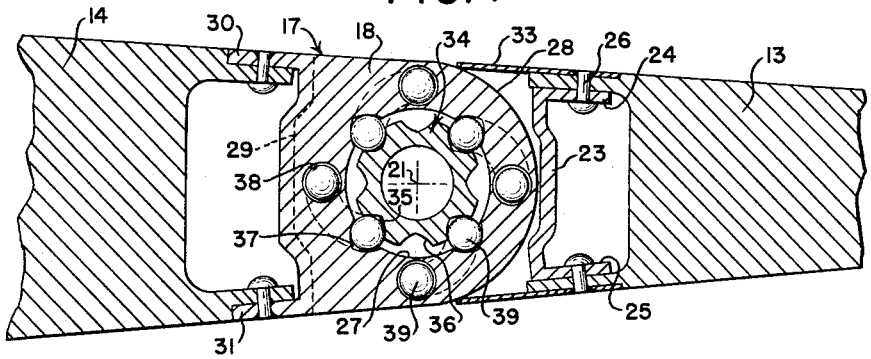
Figure 8:
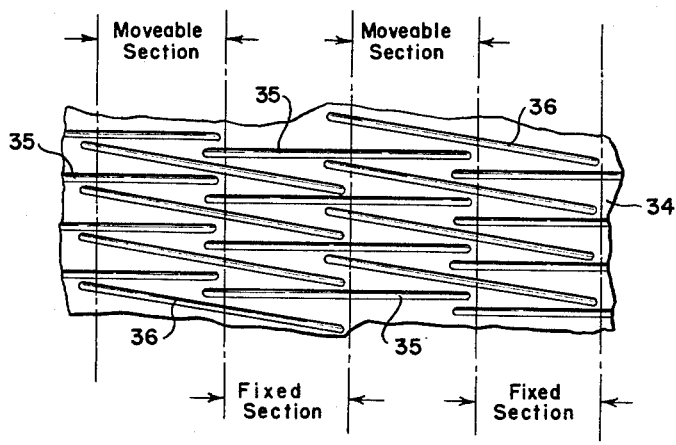
Figure 9:
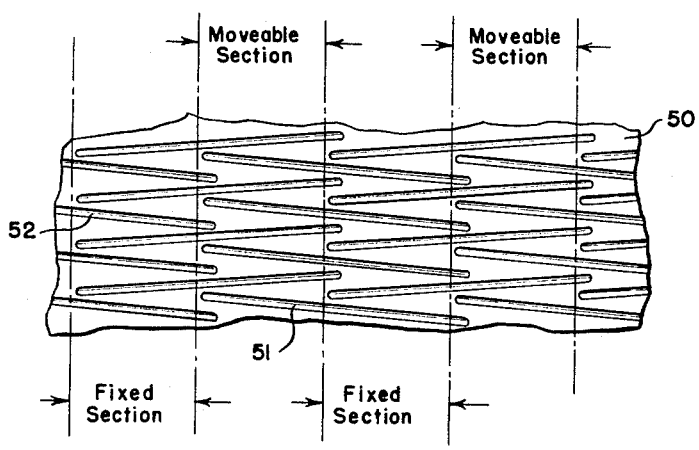

Figs. 6 and 7 are enlarged fragmentary cross-sectional views taken along lines 6—6 and 7—7, respectively, of Fig. 1; and Figs. 8 and 9 are fragmentary developed views of alternate forms of control rods which may be incorporated in the assembly of Fig. 1.

Referring now to the drawings, and initially to Fig. 1 thereof, the reference numeral 10 designates generally the fuselage of an aircraft, from which extends a wing section 11. The wing section 11 may, in general, be of conventional construction, being secured at its root end 12 to the frame structure of the aircraft fuselage 10. Intermediate the ends of the wing 11 is a movable flight controlling element 13, which may be a wing flap or aileron, for example. For the purpose of the present description, the control element 13 will be considered a wing flap, it being understood, however, that no limitation is thereby intended.

The flap 13 is hinged to the main body 14 of the wing for movement about an axis extending generally spanwise of the wing. Normally, the flap is held in alignment with the main body of the wing and effectively constitutes an integral part of the lifting surface. At desired times, however, the flap may be pivoted downwardly to increase the drag and lift of the aircraft.

In accordance with one aspect of the invention, the flap 13 is comprised of a plurality of separate sections 13', of relatively short spanwise dimension, as compared to the total spanwise dimension of the flap. The separate flap sections 13' are each structurally independent of the other. However, as will be set forth in more detail, the several sections 13' are operated in unison and collectively comprise a single flap, and, for this reason, reference is sometimes made herein to the flap 13 as a single, unitary element.

As shown in Fig. 1, the leading edges of the flap sections 13' have mounted thereon hinge members 15 arranged in end-to-end relation and extending from one end to the other of the flap. Each member 15 has a plurality of conveniently spaced hinge arms 16. A mating hinge member 17, having a large plurality of hinge arms 18, is secured to the wing body 14 and extends from one end to the other of a recess 19 provided in the wing body for receiving the flap 13. The plurality of hinge arms 16, 18 of the respective hinge members 15, 17 are arranged so that the first plurality of arms 16 are closely received in the spaces between the second plurality of arms 18, and vice versa. The hinge arms 16, 18 may be of equal spanwise thickness, and the space between arms may be approximately equal to the thickness of the arms, some allowance being made, however, for the insertion between some or all of the hinge arms of suitable thrust bearings 18'. Accordingly, when the hinge members 15, 17 are arranged in interfitting relation, a hinge structure is provided which outwardly resembles an oversize piano hinge.

While the exact spacing of the hinge arms 16, 18 is not deemed to be critical, it will be understood that maximum strength and load capacity of a particular structure will be realized if the spacing is uniform and the hinge arms are of equal spanwise dimension.

As shown in Fig. 6, the hinge arms 16 of hinge members 15 are provided with circular openings 20 disposed concentrically with respect to the hinge axis 21, and the outer portions 22 of the hinge arms are of semi-circular form, concentric with the axis 21. The spaced hinge arms are integrally connected by web portions 23 extending the entire length of each hinge member and having spaced rearwardly projecting flanges 24, 25, whereby the hinge members may be attached to the respective flap sections 13', as by rivets 26, for example.

The hinge member 17 (Fig. 7) is generally similar in cross-section to the hinge members 15, and the arms 18 thereof have circular openings 27 disposed in concentric relation to the hinge axis 21. The trailing or outer portions 28 of the hinge arms 18 are of semi-circular form, concentric with the hinge axis 21, and the separate arms 18 are connected by a web 29 which extends throughout the length of the hinge member 17 and has flanges 30, 31 for attaching the hinge member to the wing body 14.

As shown in Figs. 6 and 7, the inner portions of the respective hinge members 15, 17 are shaped to conform with and continue the outer surfaces of the wing body 14 and flap sections 13'. In addition, aerodynamic seals 32, 33 project from the wing body and flap, respectively, and engage the semi-circular outer portions 22, 28 of the hinge arms 16, 18, whereby a generally continuous wing surface is provided about the hinge.

Received in the aligned openings 20, 27 in respective hinge arms 16, 18, is an elongated control rod 34. Advantageously, the control rod 34 may be hollow and is tapered from its inboard end to its outboard end; and, by way of example only, a control rod of approximately twenty feet in length may taper from an outside diameter of approximately four inches at its inboard end to an outside diameter of approximately two inches at its outboard end. The diameter of the control rod 34 is at all points less than the diameter of the hinge arm openings 20, 27 (see Figs. 6 and 7) and in this respect it will be understood that the diameter of the openings 20, 27 is successively decreased in the outboard hinge arms to correspond with the tapering of the control rod 34.

In accordance with the invention, the control rod 34 is provided throughout its length with first and second sets of grooves 35, 36. As shown in Fig. 8, for example, the grooves 35 are disposed in parallel relation to the axis of the control rod and are arranged in sets (four in the illustration), the grooves being spaced circumferentially about the control rod. A plurality of sets of the first grooves 35 are provided throughout the length of the control rod 34, and, as indicated in Fig. 8, adjacent sets of the grooves are advantageously displaced circumferentially with respect to each other and axially overlapped. Grooves 36, of the second type, are disposed at an angle with respect to the grooves 35, whereby each groove 36 is in the form of a helix. The grooves 36 are also provided in sets, each consisting of four grooves spaced circumferentially on the shaft, with axially adjacent sets of the grooves 36 being circumferentially displaced and axially overlapped.

Advantageously, the control rod 34 is of a step-tapered construction, in that each successive set of grooves along the rod is formed about a different diameter, such diameter decreasing toward the outboard end of the control rod. Thus, with reference to Fig. 2, the grooves denoted "a" are formed about a larger diameter than are the grooves denoted "b," located farther out along the control rod.

It will be understood, of course, that each set of grooves is disposed along a constant diameter throughout its length; and this is true notwithstanding that there is substantial overlap between successive sets of grooves. In Fig. 6, for example, the grooves 35 are formed about a larger diameter than are the grooves 36, while in Fig. 7, the grooves 36 are formed about a larger diameter than are the grooves 35. The arrangement is shown more clearly in Fig. 3, wherein the axes of grooves 35 are disposed a distance $R_1$ from the axis of the control rod 34, while the axes of grooves 36 are disposed a lesser distance $R_2$ from the control rod axis. The difference "d" between $R_1$ and $R_2$ constitutes the incremental or "step" taper of the control rod for a unit of length thereof.

The preferred construction of the control rod 34, as illustrated in Fig. 3, is such that at any cross section, the grooves disposed along the larger diameter are provided with built-up shoulders, as at 35'. This is desirable for the purposes of maintaining the weight of the control rod as low as practicable.

In each of the hinge arms 18 of the fixed hinge member 17 there are provided a plurality of grooves 37 disposed in parallel relation to the hinge axis 21 and spaced circumferentially about the openings 27 in such manner as to be aligned with the grooves 35 of the control rod 34. The grooves 37 communicate at their opposite ends with end fittings leading to return passages 38 (Fig. 2). The grooves 35 and 37 form coacting pairs of grooves of a first type, and are arranged to receive a plurality of antifriction balls 39. The arrangement is such that when the control rod 34 is moved axially with respect to the hinge arms 18 the antifriction balls 39 will roll in the grooves 35, 37, providing antifriction support for the control rod and maintaining the rod in centered relation to the hinge arms. During movement of the control rod, antifriction balls will successively reach the ends of the hinge arm grooves 37, whereupon the balls will move through end fittings into their return or recirculating passages 38. At the same time, balls are fed from the opposite ends of the recirculating passages into the hinge arm grooves 37 so that the number of balls supporting the rod remains substantially constant. In the principal form of the invention, the grooves 35, 37 are parallel to the axis of the control rod 34 and operate, in combination with the antifriction balls 39, to prevent rotation of the control rod. This is an important aspect of the invention, as will be more fully explained.

In each of the hinge arms 16 of the movable hinge members 15 there are provided a plurality of grooves 40 disposed at an angle to the hinge axis 21 and spaced circumferentially about the hinge arm openings 20 in such manner as to be aligned with the helical grooves 36 in the control rod 34. The grooves 40 communicate at their opposite ends with end fittings 41 leading to recirculating passages 41' (Fig. 2). The sets of grooves 36, 40 receive antifriction balls 42 which act between the control rod 34 and hinge arms 16 to form an antifriction connection facilitating longitudinal movement of the control rod. The mutually inclined sets of balls and grooves cooperatively function as splines whereby upon axial movement of the control rod the several hinge members 15 and flap sections 13' are pivoted with respect to the wing body 14, about the hinge axis 21.

In the principal embodiment of the invention, wherein the sets of grooves 35, 37 are parallel to the hinge axis 21, the control rod is held against rotation with respect to the main wing body 14. Accordingly, when the rod 34 is moved to the left the antifriction balls 42 acting between the control rod and flap hinges 15 are forced by the grooves 36 to shift circumferentially about the control rod, causing the flap sections 13' to be pivoted downwardly, in unison. The reverse is true, of course, when the control rod is moved to the right. In the illustrated form of the invention, a suitable actuator 43, mounted in the wing root or aircraft fuselage, is connected to the control rod 34 for effecting longitudinal movement thereof. The actuator 43 may be of a conventional type, and does not, in itself, form a part of the invention.

In the alternate form of the invention indicated in Fig. 9, a modified control rod 50 is provided with sets of grooves 51, 52 which are mutually inclined and which are also inclined in opposite directions with respect to the hinge axis. The respective hinge arms (not specifically shown) are accordingly modified, so that the grooves of the hinge arms are properly inclined to form cooperating sets of grooves, in combination with the grooves of the rod 50.

When the control rod 50 is shifted axially it is caused to rotate with respect to the wing body, by the sets of balls and grooves including grooves 51. At the same time, the wing flap is caused to rotate with respect to the control rod 50, by the sets of balls and grooves including grooves 52. The angle of incline of the respective grooves 51, 52 of the modified control rod with respect to the hinge axis is approximately one-half that of the inclined grooves 36 of the first-described form of the invention.

In the principal form of the invention, the antifriction balls 39 and grooves 35, 37 form an anti-rotation guide means for the control rod 34, in addition to providing friction-free support therefor. In the embodiment of Fig. 9, the sets of grooves provide for the controlled rotation of the control rod, during axial movement thereof, in addition to effecting relative rotation between the control rod and flight controlling element, to effect pivoting movement of the latter. The modified form of control rod, shown in Fig. 9, is desirable in certain instances, since control rods of identical construction may be used on both the right and left wings of an aircraft. In both forms of the invention, however, several important advantages are realized.

An important advantageous feature of the invention resides in the provision of an aircraft control surface assembly in which an axially movable control rod functions as a hinge and control linkage for a movable flight controlling element and, in addition, permits the hinge assembly to form an active part of the structure of the control surface assembly. The advantages of the invention are realized by the provision of a continuous hinge structure extending substantially the entire spanwise length of the movable flight controlling element and operatively interconnecting the respective parts of the control surface assembly by means of a series of antifriction ball-screw actuator units. A single control rod acts upon all parts of the hinge structure, and is so incorporated therewith as to operate in the absence of sliding friction, even when the control surface is flexed. Accordingly, the control assembly may be utilized as an active structural element in the assembly.

Another important feature of the invention resides in the provision of the piano hinge-like assembly, in combination with the antifrictionally supported control rod having mutually inclined sets of grooves for each of the respective pairs of hinge arms. The arrangement is such that torsional forces imparted to the control rod are reacted at points immediately adjacent the points at which the torsional forces are applied. Accordingly, torsional deflection of the control rod and/or the flight controlling element is reduced to a negligible amount.

One of the important advantages of the new assembly is realized by the provision of a movable flight controlling member, such as a wing flap, which is comprised of a plurality of structurally independent sections, all sections being operated in unison, however, upon axial movement of the control rod. The multi-section structure of the flight controlling element is of particular importance in connection with thin control surfaces, which are likely to be deflected substantially in flight. Thus, by way of example, if the main control surface body is deflected upwardly, and the flight controlling element is pivoted downwardly, splitting or other damage to the flight controlling element is avoided by the structural independence of the several sections thereof.

Another advantage realized in the new assembly is the reduction of flutter which is sometimes a substantial problem, in connection with aircraft having thin control surfaces. The piano hinge-like structure provides continuous support for the flight controlling element throughout its length, and thereby strengthens its leading edge portion. Moreover, the new hinge structure permits of a lighter overall assembly, in which the center of gravity of the flight controlling element is as close as practicable to its hinge axis, a relationship which results in a further reduction of flutter.

It should be understood, however, that the specific forms of the invention herein described are intended to be illustrative only, as certain changes may be made therein without departing from the clear teachings of the invention. Reference should therefore be made to the following appended claims in determining the full scope of the invention.

We claim:

1. In an aircraft control surface assembly comprising a flexible airfoil secured at its root end in an aircraft and a movable flight control surface hinged to said airfoil along an axis extending generally spanwise of said assembly and lying within the cross-sectional outlines of said assembly the improvement which comprises a first plurality of hinge arms carried by said airfoil, at least some of said hinge arms being located a substantial distance outwardly of the root end of said airfoil, a second plurality of hinge arms carried by said flight control surface and arranged in coacting relation with said first hinge arms, said hinge arms having aligned openings therein disposed along said axis, an elongated control rod received in said openings and adapted for axial movement therein, said control rod being provided with a plurality of sets of grooves substantially along its entire length thereof, each set being associated with one of said hinge arms, said grooves being of first and second types, with said first type of grooves being disposed at an angle to the grooves of said second type, and with adjacent sets of grooves of said first and second types residing in overlapping relationship along said axis, the openings of said first hinge arms having grooves therein corresponding to the grooves of said first type on said rod, and the openings of said second hinge arms having grooves therein corresponding to the grooves on said rod of said second type, antifriction balls received in said corresponding grooves, means for recirculating said antifriction balls in each said corresponding set of grooves, and actuator means for moving said control rod longitudinally of said axis.

2. In an aircraft control surface assembly comprising a flexible airfoil secured at its root end in an aircraft and a movable flight control surface hinged to said airfoil along an axis extending generally outwardly from the root end of said assembly, the improvement which comprises a first plurality of hinge arms carried by said airfoil and spaced along said axis, a second plurality of hinge arms carried by said flight control surface and spaced along an edge of said flight control surface, said first and second hinge arms being closely interfitted and having aligned openings therein concentric with said axis, a control rod extending through said openings for interconnecting said hinge arms, said control rod being provided with a plurality of sets of grooves, the grooves constituting each set being circumferentially spaced about said rod, said grooves being of first and second types, with the sets of grooves of said first type being disposed alternately along said rod with the grooves of said second type, said first type of grooves being disposed at an angle to the grooves of said second type, with adjacent sets of grooves of said first and second types residing in overlapping relationship, the openings of said first hinge arms having grooves therein corresponding to the grooves of said first type on said rod, the openings of said second hinge arms having grooves therein corresponding to the grooves on said rod of said second type, recirculating antifriction elements received in the corresponding sets of grooves, and actuator means for moving said control rod axially with respect to said hinge arms.

3. An aircraft control surface assembly according to claim 2, characterized by said aligned openings being of greater diameter than said control rod at all points on said rod whereby to provide a substantial clearance between said rod and said openings, and said antifriction members acting between said hinge arms and said control rod to maintain said rod in concentric relation to said openings.

4. An aircraft control surface assembly according to claim 2, characterized by said flight control surface comprising a plurality of structurally independent sections of relatively short spanwise dimension in relation to the spanwise dimension of said surface, said sections being movable in unison by said control rod.

5. In an aircraft control surface assembly comprising an airfoil having inboard and outboard ends, and a movable flight control surface hinged to said airfoil along an axis extending generally spanwise of said assembly and lying within the cross-sectional outlines of said assembly, the improvement which comprises a first hinge member carried by said airfoil and having a length substantially equal to the length of said flight control surface, said first hinge member having throughout its length a series of closely spaced integral hinge arms projecting at right angles to said axis, each of said arms having an opening therein aligned with said axis, second hinge means carried by said flight control surface and having throughout its length a series of closely spaced integral hinge arms projecting at right angles to said axis and received in spaces between the arms of said first hinge member, each arm of said second hinge means having an opening therein aligned with said axis, an elongated control rod received in the aligned opening of said first and second hinge arms for hingedly securing said flight control surface to said airfoil and for structurally coupling said body and flight control surface, said control rod being provided with a plurality of sets of grooves, each set being associated with one of said hinge arms, said grooves being of first and second types, with said first type of grooves being disposed at an angle to the grooves of said second type, said control rod being step-tapered, with adjacent sets of grooves of said first and second types residing in overlapping relationship at successively decreasing distances from said axis in the outboard direction, the openings of said first hinge arms having grooves therein corresponding to the grooves of said first type on said rod, the openings of said second hinge arms having grooves therein corresponding to the grooves on said rod of said second type, antifriction elements received in corresponding grooves, and actuator means for effecting axial movement of said control rod.

6. An aircraft control surface assembly according to claim 2 in which the antifriction elements of each pair of corresponding grooves have individual recirculating means.

7. In a control surface assembly comprising an airfoil, and a movable control surface hinged to said airfoil along a fixed axis, the improvement which comprises a first plurality of hinge arms carried by said airfoil and spaced along said axis, said control surface having a plurality of second hinge arms closely interfitted with said first hinge arms, said control surface extending along said axis for a considerable portion of the total length of said airfoil, said first and second hinge arms being closely interfitted and having aligned openings therein concentric with said axis, a control rod extending through said opening for interconnecting said hinge arms, said first hinge arms and said control rod having coacting sets of grooves of a first type, said second hinge arms and said control rod having coacting sets of grooves of a second type disposed at an angle to the grooves of said first type, the grooves on said rod associated with each hinge arm being circumferentially spaced about said rod and residing at substantially constant distance from said axis, said rod being step-tapered, with the grooves associated with each hinge arm residing on said rod in axially overlapped relationship with the grooves associated with the next hinge arm, but located at a different distance from the center of said axis than the grooves of the next hinge arm, antifriction elements received in corresponding sets of grooves, independent recirculating means for the antifriction elements of corresponding grooves, and actuator means for moving said control rod axially with respect to said hinge arms to bring about a controlled deflection of said control surface.

References Cited in the file of this patent

UNITED STATES PATENTS

| | | |
|---|---|---|
| 2,443,808 | Stalker | June 22, 1948 |
| 2,724,284 | Anderson et al. | Nov. 22, 1955 |
| 2,743,618 | Watson et al. | May 1, 1956 |